(12) United States Patent
Lee et al.

(10) Patent No.: US 9,594,473 B2
(45) Date of Patent: Mar. 14, 2017

(54) SOUND VISUALIZATION METHOD AND APPARATUS OF ELECTRONIC DEVICE

(71) Applicant: Samsung Electronics Co., Ltd., Gyeonggi-do (KR)

(72) Inventors: Hyungmin Lee, Seoul (KR); Inwon Jong, Seoul (KR); Chulho Jang, Seoul (KR)

(73) Assignee: Samsung Electronics Co., Ltd (KR)

( * ) Notice: Subject to any disclaimer, the term of this patent is extended or adjusted under 35 U.S.C. 154(b) by 262 days.

(21) Appl. No.: 14/469,344

(22) Filed: Aug. 26, 2014

(65) Prior Publication Data

US 2015/0067511 A1    Mar. 5, 2015

(30) Foreign Application Priority Data

Aug. 27, 2013  (KR) .................. 10-2013-0101838

(51) Int. Cl.
| | |
|---|---|
| *G06F 3/16* | (2006.01) |
| *G06F 3/048* | (2013.01) |
| *G06F 3/0482* | (2013.01) |

(52) U.S. Cl.
CPC ............ *G06F 3/0482* (2013.01); *G06F 3/165* (2013.01)

(58) Field of Classification Search
CPC ............................... G06F 3/165; G06F 3/0482
USPC ........................................ 715/716, 727, 728
See application file for complete search history.

(56) References Cited

U.S. PATENT DOCUMENTS

| | | | | |
|---|---|---|---|---|
| 3,815,128 A * | 6/1974 | McClure | ................. | A63J 17/00 340/683 |
| 5,459,830 A * | 10/1995 | Ohba | .................. | G11B 27/031 345/473 |
| 6,245,982 B1 * | 6/2001 | Suzuki | ................ | G09B 15/002 84/477 R |
| 6,701,010 B1 * | 3/2004 | Katsuyama | .......... | G06T 7/0081 382/165 |
| 6,938,209 B2 * | 8/2005 | Ogawa | ............. | G06F 17/30017 707/E17.009 |
| 7,478,323 B2 * | 1/2009 | Dowdy | ................... | G09F 23/00 715/243 |
| 7,924,328 B2 * | 4/2011 | Cazier | .................... | G10L 21/10 348/239 |
| 7,970,119 B2 * | 6/2011 | Ericson | .................. | G10H 1/368 379/373.02 |
| 8,068,105 B1 * | 11/2011 | Classen | ................ | G06T 11/206 345/440 |
| 8,996,538 B1 * | 3/2015 | Cremer | ............ | G06F 17/30864 707/749 |

(Continued)

FOREIGN PATENT DOCUMENTS

KR    10-2007-0085631    8/2007

*Primary Examiner* — Daeho Song
(74) *Attorney, Agent, or Firm* — The Farrell Law Firm, P.C.

(57) ABSTRACT

A method and an apparatus are provided for audio data playback in an electronic device. Pieces of color information, included in an image that is matched to audio data, are acquired, when the audio data is requested. At least one of the pieces of color information is mapped to at least one sound level range of predetermined audible sound according to a percentage of a respective color in the image. A predetermined object pattern is displayed using the at least one of the pieces of color information mapped to the at least one sound level range of the audio data, when the audio data is played.

20 Claims, 8 Drawing Sheets

(56) References Cited

U.S. PATENT DOCUMENTS

| | | | | |
|---|---|---|---|---|
| 9,213,705 B1* | 12/2015 | Story, Jr. | ............ | G06F 17/30056 |
| 2002/0081026 A1* | 6/2002 | Izume | ................ | G06F 17/3025 |
| | | | | 382/170 |
| 2003/0039372 A1* | 2/2003 | Tsutsumi | ................ | H04S 1/007 |
| | | | | 381/107 |
| 2003/0086004 A1* | 5/2003 | Usami | ................. | H04N 1/6011 |
| | | | | 348/223.1 |
| 2004/0054542 A1* | 3/2004 | Foote | ....................... | G09B 5/00 |
| | | | | 704/500 |
| 2004/0139842 A1* | 7/2004 | Brenner | ................. | G09B 15/00 |
| | | | | 84/477 R |
| 2004/0199277 A1* | 10/2004 | Bianchi | ............. | G11B 20/1816 |
| | | | | 700/94 |
| 2005/0080633 A1* | 4/2005 | Lueck | ................... | G10L 15/22 |
| | | | | 704/278 |
| 2006/0235753 A1* | 10/2006 | Kameyama | ........ | B60H 1/00742 |
| | | | | 705/15 |
| 2007/0005700 A1* | 1/2007 | Wagner | ............. | G06F 17/30713 |
| | | | | 709/204 |
| 2007/0091203 A1* | 4/2007 | Peker | ................ | G06F 17/30793 |
| | | | | 348/415.1 |
| 2007/0188666 A1* | 8/2007 | Oh | ....................... | G06F 3/04847 |
| | | | | 348/808 |
| 2007/0256548 A1* | 11/2007 | Tagawa | ................ | G10H 1/0008 |
| | | | | 84/634 |
| 2008/0001971 A1* | 1/2008 | Kouninski | ............... | G09G 3/20 |
| | | | | 345/635 |
| 2008/0019531 A1* | 1/2008 | Kimijima | .................. | H04S 7/30 |
| | | | | 381/1 |
| 2008/0026690 A1* | 1/2008 | Foxenland | ............. | G10H 1/368 |
| | | | | 455/3.06 |
| 2008/0066611 A1* | 3/2008 | Makino | ................. | G10H 1/0008 |
| | | | | 84/609 |
| 2008/0089615 A1* | 4/2008 | Shiiyama | ............. | G06K 9/4642 |
| | | | | 382/305 |
| 2008/0130918 A1* | 6/2008 | Kimijima | ................ | H04S 1/007 |
| | | | | 381/107 |
| 2008/0256450 A1* | 10/2008 | Takakura | .......... | G06F 17/30064 |
| | | | | 715/721 |
| 2008/0260167 A1* | 10/2008 | Kim | ........................ | G01H 3/04 |
| | | | | 381/56 |
| 2009/0015594 A1* | 1/2009 | Baba | .................... | G10H 1/0008 |
| | | | | 345/619 |
| 2010/0092107 A1* | 4/2010 | Mochizuki | ........... | H04N 9/8211 |
| | | | | 382/309 |
| 2011/0075860 A1* | 3/2011 | Nakagawa | ............... | G01H 3/00 |
| | | | | 381/94.1 |
| 2011/0191674 A1* | 8/2011 | Rawley | ................... | G06F 3/016 |
| | | | | 715/702 |
| 2011/0266981 A1* | 11/2011 | Umezawa | .............. | G21K 1/093 |
| | | | | 315/506 |
| 2011/0273455 A1* | 11/2011 | Powar | ............... | G06F 17/30769 |
| | | | | 345/473 |
| 2012/0124470 A1* | 5/2012 | West | ..................... | G06F 3/0488 |
| | | | | 715/702 |
| 2012/0219214 A1* | 8/2012 | Bao | ......................... | H04N 1/60 |
| | | | | 382/164 |
| 2012/0253545 A1* | 10/2012 | Tachibana | ............ | A61N 5/1079 |
| | | | | 700/306 |
| 2013/0147835 A1* | 6/2013 | Lee | ....................... | H04R 3/005 |
| | | | | 345/629 |
| 2013/0148886 A1* | 6/2013 | Misawa | ................... | G06K 9/36 |
| | | | | 382/165 |
| 2013/0182002 A1* | 7/2013 | Macciola | ............... | H04N 1/387 |
| | | | | 345/589 |
| 2013/0185753 A1* | 7/2013 | Kliot | ................ | H04N 21/47217 |
| | | | | 725/39 |
| 2013/0275872 A1* | 10/2013 | Kim | ...................... | G01S 3/8006 |
| | | | | 715/716 |
| 2013/0342430 A1* | 12/2013 | Huang | ................. | G09G 3/3406 |
| | | | | 345/88 |
| 2014/0050367 A1* | 2/2014 | Chen | .................. | H04N 5/23212 |
| | | | | 382/112 |
| 2014/0208922 A1* | 7/2014 | Adnitt | ..................... | G06F 3/048 |
| | | | | 84/609 |
| 2015/0043812 A1* | 2/2015 | Yano | .................... | G06K 9/4652 |
| | | | | 382/164 |
| 2015/0205570 A1* | 7/2015 | Johnston | ................ | G06F 3/165 |
| | | | | 715/716 |

* cited by examiner

SOUND VISUALIZATION METHOD AND APPARATUS OF ELECTRONIC DEVICE

PRIORITY

This application claims priority under 35 U.S.C. §119(a) to a Korean Patent Application filed on Aug. 27, 2013 in the Korean Intellectual Property Office and assigned Serial No. 10-2013-0101838, the entire disclosure of which is incorporated herein by reference.

BACKGROUND OF THE INVENTION

1. Field of the Invention

The present invention relates generally to sound visualization in an electronic device, and more particularly, to a method and an apparatus of an electronic device for visualizing sound with an image associated with the sound.

2. Description of the Related Art

Various types of electronic devices are equipped with a sound playback function. Examples of the sound playback function-equipped electronic device may include mobile phones, smartphones, tablet computers, laptop computers, desktop computers, Televisions (TVs), audio players, electronic dictionaries, electronic pen recorders, etc.

The sound playback-enabled electronic devices may be designed to play various formats of sound. For example, some may be designed to play predetermined audio formats of music, and others may be designed to play audiovisual formats of motion pictures. When sound is associated with a certain image, the electronic device plays the image in association with the sound. When sound is synchronized with a motion picture, the electronic device plays the sound in synchronization with the motion picture.

However, even when playing the sound synchronized with an image, the electronic device may be required to present a user-customized image or a graphic equalizer. In such a case, the electronic device may present a sound equalizer graphic animation to the user. When providing the user with the sound equalizer graphic animation, the graphic animation pattern may be preconfigured. When the electronic device plays sound, it may be configured such that various graphic animation patterns such as circle, polygonal, and cubical waveforms are selectively presented depending on whether the frequency band of the sound is low, intermediate, or high.

However, when the electronic device plays sound with a predetermined pattern of graphic animation in association with the frequency band of the sound, there is a consideration of color tone. For example, if any predetermined color pattern is stored in advance or if the user selects a certain color, the electronic device displays the graphic animation with the predetermined color pattern or with the color selected by the user.

Thus, there is no efficient use of an image matched with the sound. Suppose that a music album of a singer is played. It is likely that the music album may be provided with a visual concept intended by the singer, composer, or songwriter for expressing the music contained in the album. However, the sound-interactive graphic animation of the electronic device is limited to using only the sound spectrum data and wave data.

It is likely that the cover image and images matched to the songs contained in the album of a musician express the moods of the songs and are designed to have identities.

SUMMARY OF THE INVENTION

The present invention has been made to address at least the above problems and/or disadvantages and to provide at least the advantages described below. Accordingly, an aspect of the present invention provides a sound visualization method and apparatus of an electronic device that is capable of providing visual effects expressing the mood and emotion of the music by combining color data of the cover image of a music album, or the image matched to a specific song of the music album, and spectrum data and wave data of the music (or song).

Another aspect of the present invention provides a sound visualization method and apparatus of an electronic device that is capable of providing image, graphic, or animation interactive to the sound using the image matched to the sound or the color of the image.

An additional aspect of the present invention provides a sound visualization method and apparatus of an electronic device that is capable of presenting the user with an image, graphic, or animation that is corresponds to the sound.

In accordance with an aspect of the present invention, a method is provided for audio data playback in an electronic device. Pieces of color information, included in an image that is matched to audio data, are acquired, when the audio data is requested. At least one of the pieces of color information is mapped to at least one sound level range of predetermined audible sound according to a percentage of a respective color in the image. A predetermined object pattern is displayed using the at least one of the pieces of color information mapped to the at least one sound level range of the audio data, when the audio data is played.

In accordance with another aspect of the present invention, an apparatus is provided for sound visualization of an electronic device. The apparatus includes a memory configured to store audio data, images matched to the audio data, preconfigured object patterns, color conversion information, and information for sorting sound level ranges. The apparatus also includes an audio codec configured to convert the audio data to an electric audio signal. The apparatus additionally includes a speaker configured to output the electric audio signal in a form of an audible sound wave. The apparatus further includes a display module configured to display one of the object patterns according to the sound level range of the output audio signal. The apparatus also includes a control unit configured to control acquiring pieces of color information included in an image that is matched to the audio data when the audio data is requested, mapping at least one of the pieces of color information to at least one sound level range of predetermined audible sound according to a percentage of a respective color in the image, and displaying a predetermined object pattern on the display module using the at least one piece of color information mapped to the at least one sound level range of the audio data when the audio data is played.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
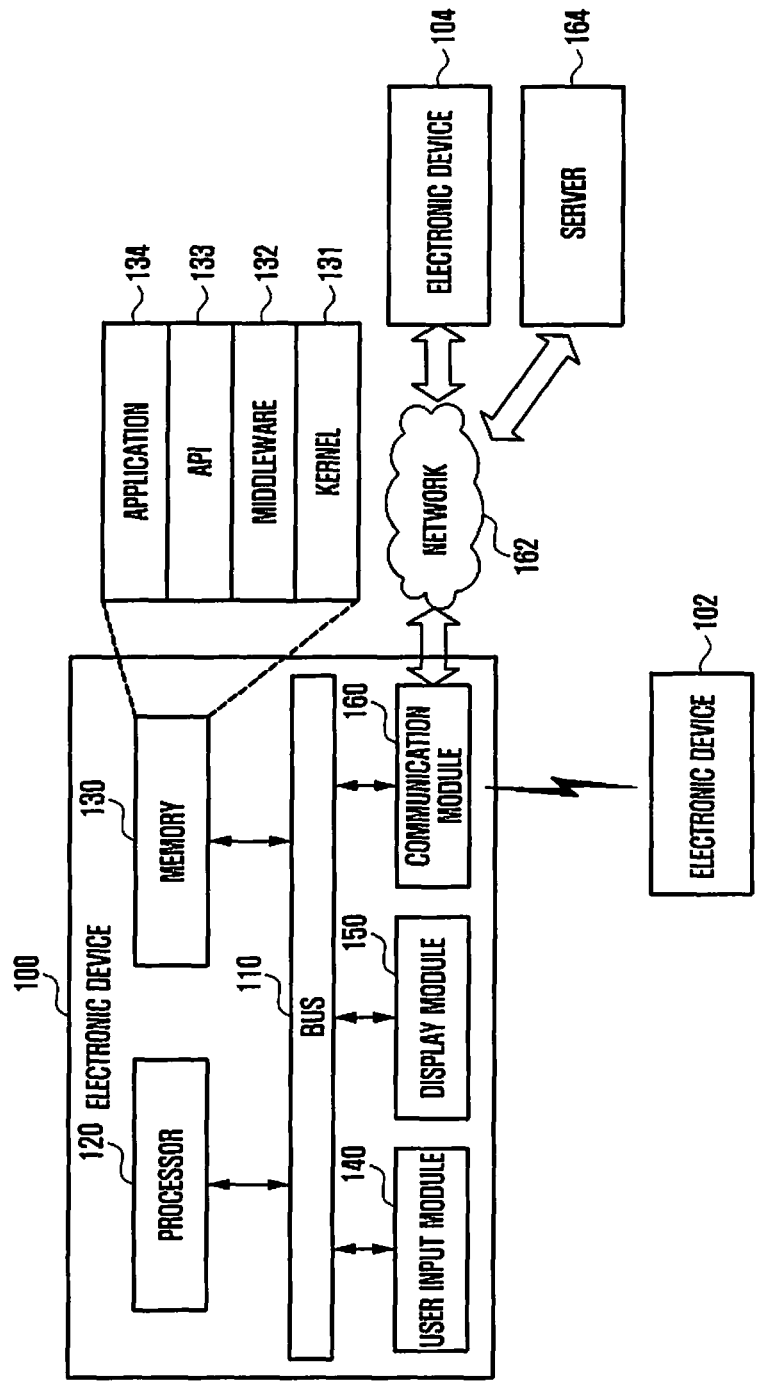
FIG. 1 is a block diagram illustrating a configuration of the electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the present disclosure. Accordingly, it should be apparent to those skilled in the art that the following description of various embodiments of the present invention is provided for illustration purposes only and not for the purpose of limiting the present invention.

It is to be understood that the singular forms "a," "an," and "the" include plural referents unless the context clearly dictates otherwise. Thus, for example, reference to "a component surface" includes reference to one or more of such surfaces.

The expressions such as "include" and "may include", which may be used herein, denote the presence of the disclosed functions, operations, and constituent elements, and do not limit one or more additional functions, operations, and constituent elements. Terms such as "include" and/or "have" may be construed to denote a certain characteristic, number, step, operation, constituent element, component, or a combination thereof, but may not be construed to exclude the existence of or a possibility of addition of one or more other characteristics, numbers, steps, operations, constituent elements, components, or combinations thereof.

Furthermore, the expression "and/or" includes any and all combinations of the associated listed words. For example, the expression "A and/or B" may include A, may include B, or may include both A and B.

Expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices, although both of them are user devices. For example, a first element could be termed a second element, and similarly, a second element could be also termed a first element without departing from the scope of the present invention.

In the case where a component is referred to as being "connected to" or "accessed by" another component, it should be understood that the component may not only be directly connected to or accessed by the other component, but also that there may exist another component between them. When a component is referred to as being "directly connected to" or "directly accessed by" another component, it should be understood that there is no component therebetween. The terms used herein are only used to describe specific embodiments, and are not intended to limit the present invention. As used herein, the singular forms are intended to include the plural forms as well, unless the context clearly indicates otherwise.

According to an embodiment of the present invention, an electronic device may be a device that includes a communication function. For example, the device corresponds to at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, an ultrasonic wave device, or the like), a navigation device, a Global Positioning System (GPS) receiver, an Event Data Recorder (EDR), a Flight Data Recorder (FDR), a set-top box, a TV box, an electronic dictionary, vehicle infotainment device, electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device, according to an embodiment of the present invention, is not limited to the aforementioned devices.

FIG. 1 is a block diagram illustrating a configuration of an electronic device, according to an embodiment of the present invention.

Referring to FIG. 1, an electronic device 100 includes a bus 110, a processor 120, a memory 130, a user input module 140, a display module 150, a communication module 160, and other similar and/or suitable components.

The bus 110 may be a circuit the interconnects the above-described elements and delivers a communication (e.g., a control message) between the above-described elements.

The processor 120 may receive commands from the above-described other elements (e.g., the memory 130, the user input module 140, the display module 150, the communication module 160, etc.) through the bus 110, may interpret the received commands, and may execute calculation or data processing according to the interpreted commands.

The memory 130 may store commands or data received from the processor 120 or other elements (e.g., the user input module 140, the display module 150, the communication module 160, etc.) or generated by the processor 120 or the other elements. The memory 130 includes programming modules including a kernel 131, middleware 132, an Application Programming Interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, etc.) used to execute operations or functions implemented by other programming modules (e.g., the middleware 132, the API 133, and the application 134). Also, the kernel 131 may provide an interface capable of accessing and controlling or managing the individual elements of the electronic device 100 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more applications 134, the middleware 132 may perform load balancing of the work requests by using a method of assigning a priority, in which system resources (e.g., the bus 110, the processor 120, the memory 130, etc.) of the electronic device 100 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The user input module 140 may receive a command or data as input from a user, and may deliver the received command or data to the processor 120 or the memory 130 through the bus 110. The display module 150 may display a video, an image, data, or the like to the user.

The communication module 160 may connect communication between another electronic device 102 and the electronic device 100. The communication module 160 may support a predetermined short-range communication protocol (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device identical (e.g., of an identical type) to or different (e.g., of a different type) from the electronic device 100. Further, the communication module 160 may connect communication between a server 164 and the electronic device 100 via the network 162.

Figure 2:
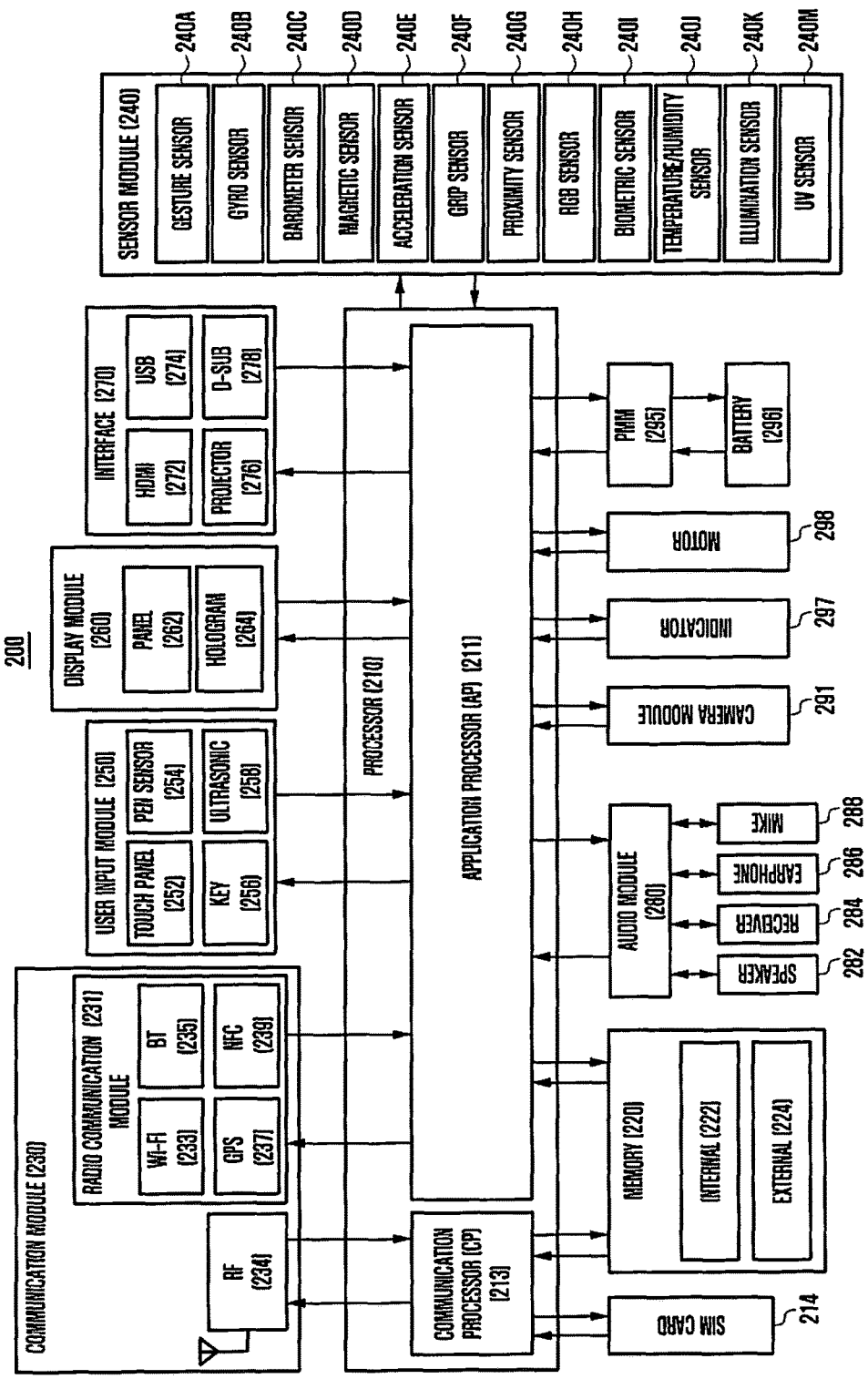
FIG. 2 is a block diagram illustrating hardware, according to an embodiment of the present invention.

FIG. 2 is a block diagram illustrating a configuration of hardware, according to an embodiment of the present disclosure.

Hardware 200 includes, for example, the electronic device 100 illustrated in FIG. 1. Referring to FIG. 2, the hardware 200 includes one or more processors 210, a Subscriber Identification Module (SIM) card 214, a memory 220, a communication module 230, a sensor module 240, a user input module 250, a display module 260, an interface 270, an audio coder/decoder (codec) 280, a camera module 291, a Power Management Module (PMM) 295, a battery 296, an indicator 297, a motor 298 and any other similar and/or suitable components.

The processor 210 (e.g., the processor 120) includes one or more Application Processors (APs) 211, or one or more Communication Processors (CPs) 213. The AP 211 and the CP 213 are illustrated as being included in the processor 210 in FIG. 2, but may be included in different Integrated Circuit (IC) packages, respectively. According to an embodiment of the present disclosure, the AP 211 and the CP 213 may be included in one IC package.

The AP 211 may execute an Operating System (OS) or an application program, and thereby may control multiple hardware or software elements connected to the AP 211 and may perform processing of and arithmetic operations on various data, including multimedia data. The AP 211 may be implemented by, for example, a System on Chip (SoC). According to an embodiment of the present invention, the processor 210 may further include a Graphical Processing Unit (GPU).

The CP 213 may manage a data line and may convert a communication protocol in the case of communication between the electronic device (e.g., the electronic device 100) including the hardware 200 and different electronic devices connected to the electronic device through the network. The CP 213 may be implemented by, for example, an SoC. According to an embodiment of the present invention, the CP 213 may perform at least some of multimedia control functions. The CP 213, for example, may distinguish and authenticate a terminal in a communication network by using a subscriber identification module (e.g., the SIM card 214). Also, the CP 213 may provide the user with services, such as, for example, a voice telephony call, a video telephony call, a text message, packet data, and the like.

Further, the CP 213 may control the transmission and reception of data by the communication module 230. In FIG. 2, elements such as the CP 213, the PMM 295, the memory 220, and the like are illustrated as elements separate from the AP 211. However, according to an embodiment of the present invention, the AP 211 may include at least some (e.g., the CP 213) of the above-described elements.

According to an embodiment of the present invention, the AP 211 or the CP 213 may load, to a volatile memory, a command or data received from at least one of a non-volatile memory and other elements connected to each of the AP 211 and the CP 213, and may process the loaded command or data. Also, the AP 211 or the CP 213 may store, in a non-volatile memory, data received from or generated by at least one of the other elements.

The SIM card 214 may be a card implementing a subscriber identification module, and may be inserted into a slot formed in a particular portion of the electronic device 100. The SIM card 214 may include unique identification information (e.g., Integrated Circuit Card IDentifier (ICCID)) or subscriber information (e.g., International Mobile Subscriber Identity (IMSI)).

The memory 220 includes an internal memory 222 and an external memory 224. The memory 220 may be, for example, the memory 130 illustrated in FIG. 1. The internal memory 222 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND)

flash memory, a Not OR (NOR) flash memory, etc.). According to an embodiment of the present invention, the internal memory 222 may be in the form of a Solid State Drive (SSD). The external memory 224 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 230 includes a wireless communication module 231 or a Radio Frequency (RF) module 234. The communication module 230 may be, for example, the communication module 160 illustrated in FIG. 1. The wireless communication module 231 includes, for example, a Wi-Fi part 233, a BT part 235, a GPS part 237, or an NFC part 239. For example, the wireless communication module 231 may provide a wireless communication function by using a radio frequency. Additionally or alternatively, the wireless communication module 231 may include a network interface (e.g., a LAN card), a modulator/demodulator (modem), or the like, for connecting the hardware 200 to a network (e.g., the Internet, a LAN, a WAN, a telecommunication network, a cellular network, a satellite network, a POTS, or the like).

The RF module 234 may be used for transmission and reception of data, for example, transmission and reception of RF signals or electronic signals. Although not illustrated, the RF unit 234 may include, for example, a transceiver, a Power Amplifier Module (PAM), a frequency filter, a Low Noise Amplifier (LNA), or the like. Also, the RF module 234 may further include a component for transmitting and receiving electromagnetic waves in a free space in wireless communication, for example, a conductor, a conductive wire, or the like.

The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor, an ElectroMyoGraphy (EMG) sensor, an ElectroEncephaloGram (EEG) sensor, an ElectroCardioGram (ECG) sensor, a fingerprint sensor, and the like. The sensor module 240 may further include a control circuit for controlling one or more sensors included therein.

The user input module 250 includes a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller. In the capacitive type, the touch panel 252 is capable of recognizing proximity as well as a direct touch. The touch panel 252 may further include a tactile layer. In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present invention, the hardware 200 may receive a user input from an external device (e.g., a network, a computer, or a server), which is connected to the communication module 230, through the communication module 230.

The display module 260 includes a panel 262 or a hologram 264. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present invention, the display module 260 may further include a control circuit for controlling the panel 262 or the hologram 264.

The interface 270 includes, for example, a High-Definition Multimedia Interface (HDMI) 272, a Universal Serial Bus (USB) 274, a projector 276, and a D-subminiature (D-sub) 278. Additionally or alternatively, the interface 270 may include, for example, SD/Multi-Media Card (MMC) or Infrared Data Association (IrDA).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288, or the like.

The camera module 291 may capture an image and a moving image. According to an embodiment of the present invention, the camera module 291 may include one or more image sensors (e.g., a front lens or a back lens), an Image Signal Processor (ISP), and a flash LED.

The power management module 295 may manage power of the hardware 200. The power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present invention, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200, according to an embodiment of the present invention, may include one or more components, and the name of the relevant element may change depending on the type of electronic device. The hardware 200, according to an embodiment of the present invention, may include at least one of the above-described elements. Some of the above-described elements may be omitted from the hardware 200, or the hardware 200 may further include additional elements. Also, some of the elements of the hardware 200, according to an embodiment of the present invention, may be combined into one entity, which may perform functions identical to those of the relevant elements before the combination.

The term "module" used herein may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module", according to an embodiment of the present invention, may include at least one of an Application-Specific Integrated Circuit (ASIC) chip, a Field-Programmable Gate Array (FPGA), and a programmable-logic device for performing certain operations which have been known or are to be developed in the future.

Figure 3:
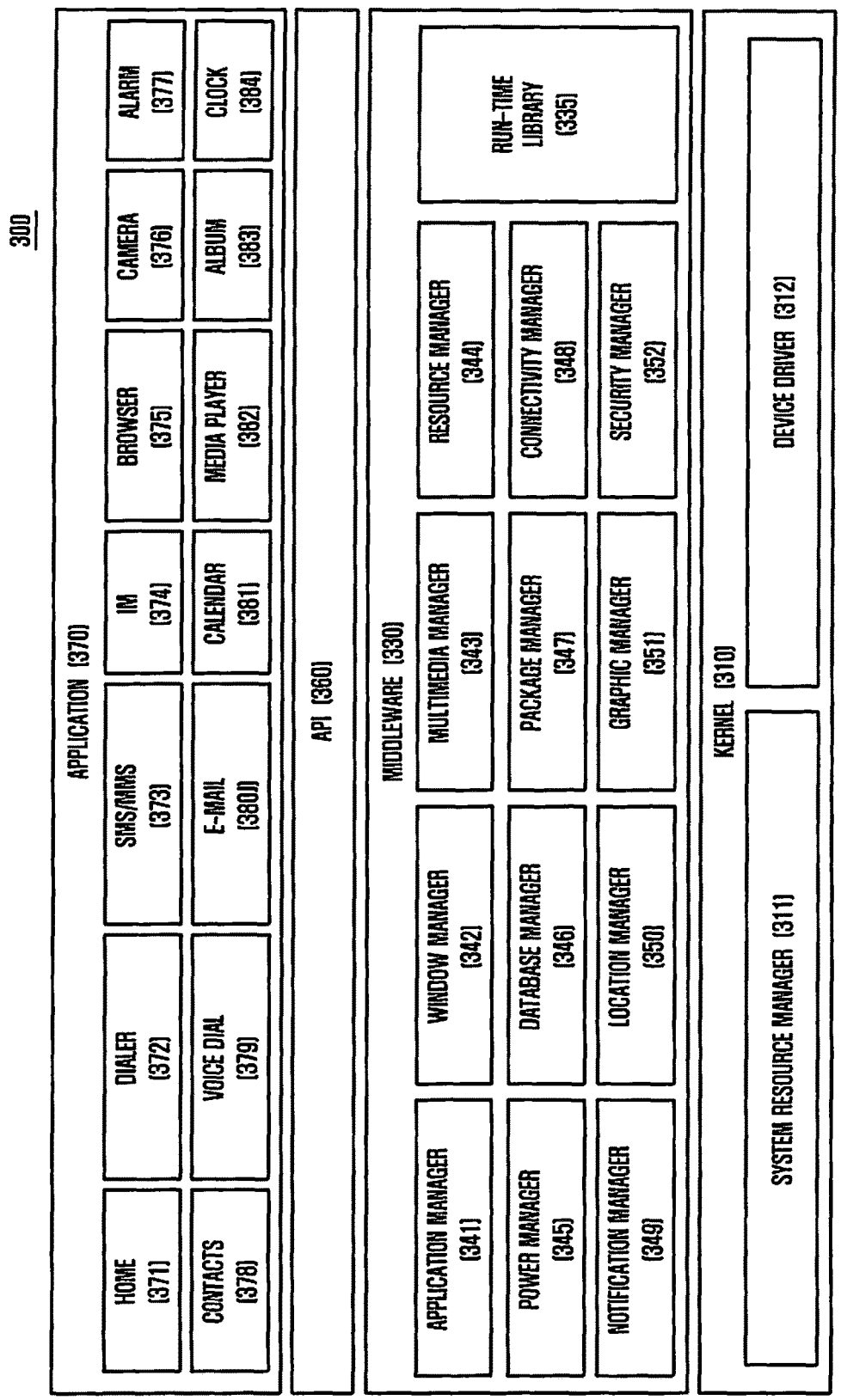
FIG. 3 is a block diagram illustrating a programming module, according to an embodiment of the present invention.

FIG. 3 is a block diagram illustrating a configuration of a programming module, according to an embodiment of the present invention.

A programming module 300 may be included (or stored) in the electronic device 100 (e.g., the memory 130) illustrated in FIG. 1 or may be included (or stored) in the hardware 200 (e.g., the memory 220) illustrated in FIG. 2. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. Referring to FIG. 3, the programming module 300 includes a kernel 310, a middleware 330, an API 360, and/or the application 370.

The kernel 310 (e.g., the kernel 131) includes a system resource manager 311 and/or a device driver 312. The system resource manager 311 may include, for example, a process manager, a memory manager, and a file system manager. The system resource manager 311 may perform the control, allocation, recovery, and/or similar system resources. The device driver 312 may include, for example, a display driver, a camera driver, a Bluetooth driver, a shared memory driver, a USB driver, a keypad driver, a Wi-Fi driver, and/or an audio driver.

Also, according to an embodiment of the present invention, the device driver 312 may include an Inter-Process Communication (IPC) driver.

The middleware 330 includes multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions that are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as, for example, a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search, and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present invention, when the electronic device (e.g., the electronic device 100) has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present invention, may further include other elements, or may replace the some of the elements with elements, each of which performs a similar function and has a different name.

The API 360 (e.g., the API 133) is a set of API programming functions, and may be provided with a different configuration according to an OS. For example, one API set may be provided to each platform. In another example, two or more API sets may be provided to each platform.

The applications 370 (e.g., the applications 134) include, for example, a preloaded application and/or a third party application. The applications 370 (e.g., the applications 134) includes, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300), according to an embodiment of the present invention, may change depending on the type of OS. The programming module, according to an embodiment of the present invention, may include one or more of the above-described elements. Alternatively, some of the above-described elements may be omitted from the programming module. Alternatively, the programming module may further include additional elements. The operations performed by the programming module or other elements, according to an embodiment of the present invention, may be processed in a sequential method, a parallel method, a repetitive method, or a heuristic method. Also, some of the operations may be omitted, or other operations may be added to the operations.

Figure 4:
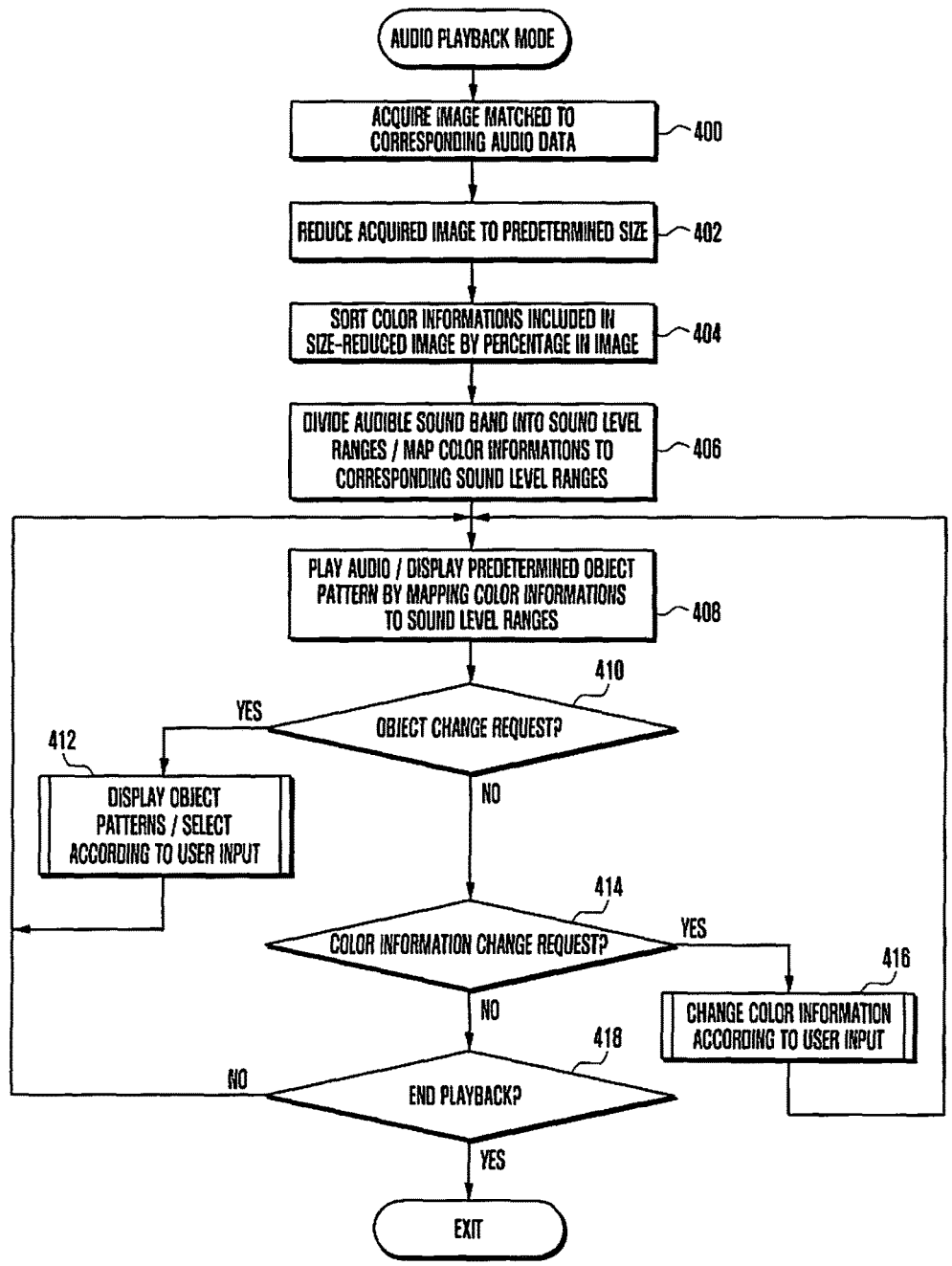
FIG. 4 is a flowchart illustrating a sound visualization method of an electronic device in an audio playback mode, according to an embodiment of the present invention.

FIG. 4 is a flowchart illustrating a sound visualization method of an electronic device in an audio playback mode, according to an embodiment of the present invention.

A description is made of the sound visualization method with reference to FIGS. 2 and 4. However, it is obvious to those in the art that the sound visualization method can be adopted to the configurations of FIGS. 1 and 3, as well as FIG. 2. The application processor 211 of FIG. 2 may be replaced by the processor 120 of FIG. 1. Also, the operations of the application processor 211 may be performed by the media player 382 of FIG. 3. In the following description, the application processor 211 of FIG. 2 may include a communication processor 213. In the following description, the application processor 211 may be referred to as 'control unit.' That is, the control unit may perform the operations of the application processor 211 and/or the communication processor 213.

In the following description, the term 'audio data' may be understood to include all types of sound data output as the user-audible sound such as, for example, sound data, sound, audio signal, sound effect, and audible sound band signal.

The control unit receives an image, which is matched to audio data that is requested for playback, from the memory 220 and a server to which the electronic device is connected, in step 400. Assuming MP3 audio data, the MP3 audio data may be stored along with album cover image data. In another example, the image file may be stored separately as mapped to the audio file. When the image file is stored separate from the audio data, the image file may be stored in the memory 220 of the electronic device or a certain server to which the electronic device has access. When the image file is stored in the server, the electronic device may connect to the server to acquire the image data. The electronic device may acquire the image file through a cellular communication network, a Wi-Fi network, or a wired network in the same or similar manner as that of normal data download. When the image is stored along with or mapped to the audio data, the audio and image data are provided in response to an audio data playback request.

The control unit decreases the acquired image to a predetermined size, in step 402. Assuming that the acquired image is 1600×1600, it may be decreased to a 200×200 image. The reason for reducing the image to a predetermined size is to facilitate simplifying or extracting the color information included in the acquired image. For example, when a red flower image is taken by the camera, the colors of the flowers are likely to be different to some extent. This is because the red flower may be taken in different conditions depending on the light angle and/or light quantity. If the flower is taken into a picture under different conditions, the number of colors to acquire from the image increases greatly and this makes it difficult to determine the ratio of colors included in the image. Accordingly, the predetermined size to which the image is downsized may be set to a value for an appropriate size for determining the number of colors to be extracted from the image associated with the audio data.

Figure 5:
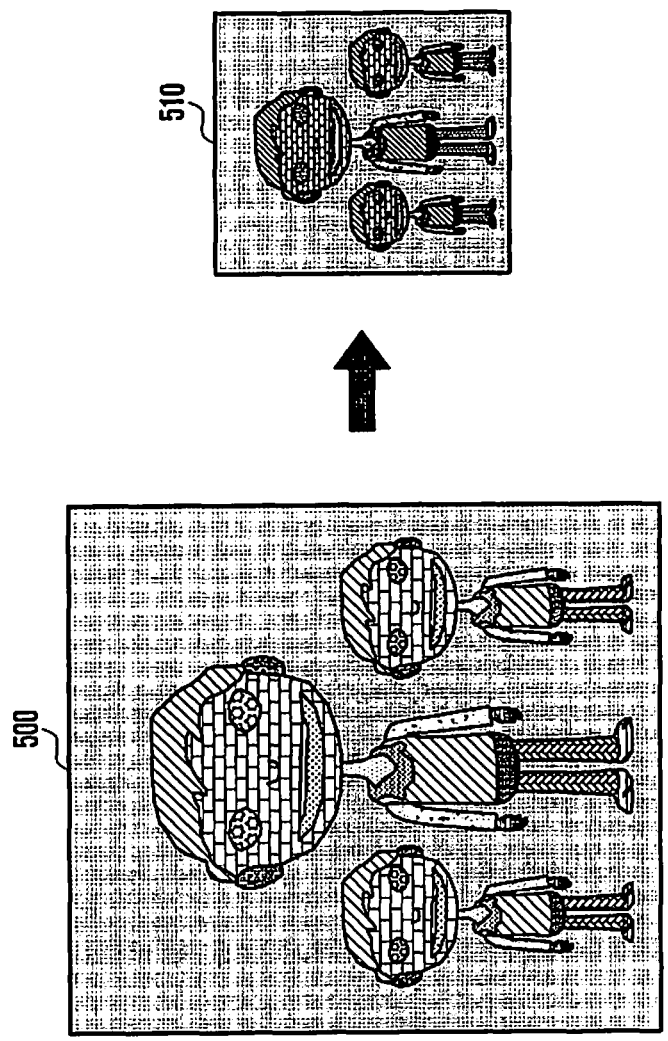
FIG. 5 is a diagram illustrating a principle of decreasing the size of the image matched to the audio file, according to an embodiment of the present invention.

FIG. 5 is a diagram illustrating a principle of decreasing the size of the image matched to the audio file, according to an embodiment of the present invention.

In FIG. 5, reference number 500 denotes the original image, and reference number 510 denotes the image reduced to a predetermined size. The original image 500 may be stored along with or matched to the audio file. When the original image 500 is greater than or equal to the predetermined size, it is processed to be the size-reduced image 510. The original image 500 may be size-reduced by dividing the original image 500 into a plurality of blocks and extracting the pixels, up to a predetermined ratio, from each block. For example, if decreasing the size of the original image as much as 50%, the original image is divided into a plurality of blocks and the same percentage of pixels are extracted from each block. In similar way, it is also possible to acquire the size-reduced image 510 by extracting the pixels up to a predetermined percentage from all positions of the original image 500. In order to reduce the size of an image, various other methods may be used.

Referring back to FIG. 4, step 402 may be replaced by a different operation or may be skipped. If step 402 is replaced by an alternative operation in an alternative embodiment of the present invention, all the color information included in the original image 500 is extracted without reducing the size of the original image. Afterward, it is possible to check the similarity of colors acquired from the original image 500 and, if the similarity is greater than or equal to a predetermined value, sort the colors into one color information. In this case, step 402 may be performed by extracting all the color information and simplifying the color information according to the similarity.

In an alternative embodiment of the present invention, if step 402 is skipped, the original image is less than or equal to the predetermined size, the number of color information is less than or equal to a predetermined value, and/or the image has been simplified already. In this or other similar cases, step 402 may be skipped.

The above description is directed to cases where step 402 is replaced with a modified operation and skipped. In the following embodiment of the present invention, step 402 is applied without modification for convenience of explanation.

The control unit sorts the color information included in the size-reduced image by ratio (or percentage) in the corresponding image, in step 404. Since the image has been size-reduced, and thus, the number of colors has been reduced in the size-reduced image 510, the number of pieces of color information to be sorted is likely to be less than of the original image 500.

At step 404, the color information included in the size-reduced image 510 is sorted by percentage in the reduced-size image 510. If specific colors occupying the reduced-size image 510 are 35%, 17%, 11%, and 6%, this means that the colors are sorted by percentage. This is described in greater detail below with reference to FIG. 6.

Figure 6:
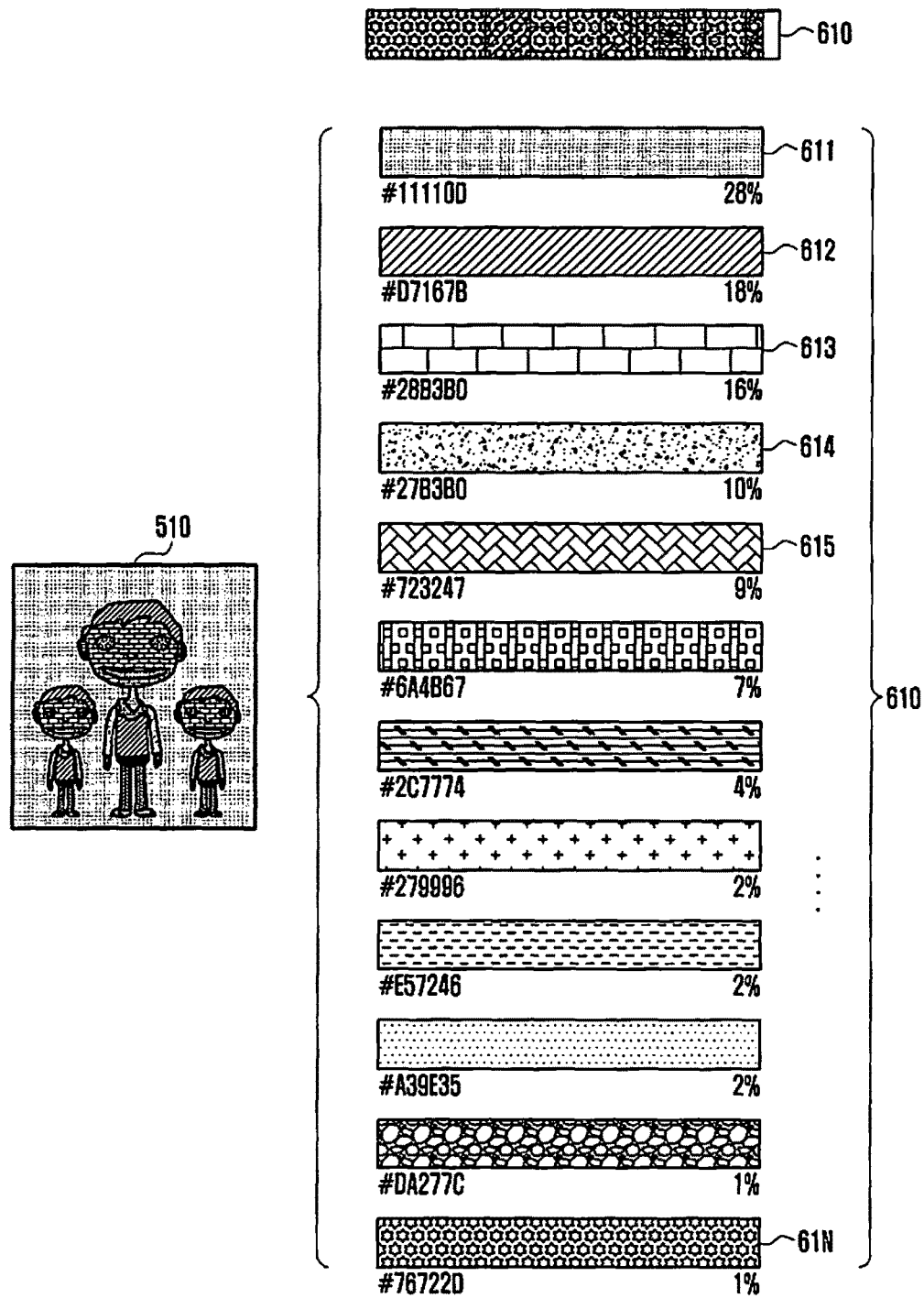
FIG. 6 is a diagram illustrating a principle of sorting the color information by percentage in the image in a descending order, according to an embodiment of the present invention.

FIG. 6 is a diagram illustrating a principle of sorting the color information by percentage in the image in a descending order, according to an embodiment of the present invention.

Assuming N pieces of color information are extracted from the size-reduced image 510, the pieces of color information are sorted by percentage as denoted by reference number 600. However, the pieces of information on the respective colors may have unique code values, e.g., #1111000 611, #D7267B 612, #28B3BO 613, #27B3BO 614, #723247 615, . . . , #76722D 61N, as denoted by reference number 610. The percentages of colors constituting the size-reduced image 510 may be 28%, 18%, 16%, 10%, . . . , 1%, respectively. In this way, the pieces of color information may be sorted by percentage in an ascending or descending order. Meanwhile, the percentages of the colors included in the reduced image may be identical with or similar to the percentages in the original image 500.

Referring back to FIG. 4, the control unit divides the audible sound into a plurality of sub-bands and maps the colors to all or some of the sub-bands, in step 406. Diving the audible sound band into a plurality of sub-bands and mapping the colors to all or some of the sub-bands may be performed in various manners. The audible sound band is in the range from 20 Hz to 20000 Hz. However, it is possible to use a part of the audible sound band or a sound band broader than the audible sound band of 20 hz to 20000 hz. In the case of using a part of the audible sound band, the band may be set to the range from 20 hz to 16000 hz or from 400 hz to 16000 hz. In the case of using the band broader than the audible sound band, the band may be set to the range from 0 hz to 22000 hz. In this way, it is also possible to map the colors to the frequency band including inaudible frequencies, if necessary. Although the description has been made with specific values, the embodiments of the present invention are not limited thereto. The frequency band to be used may be determined depending on the properties of the audio file.

The frequency band may be divided in various ways. This is described in greater detail below with reference to FIG. 7.

Figure 7:
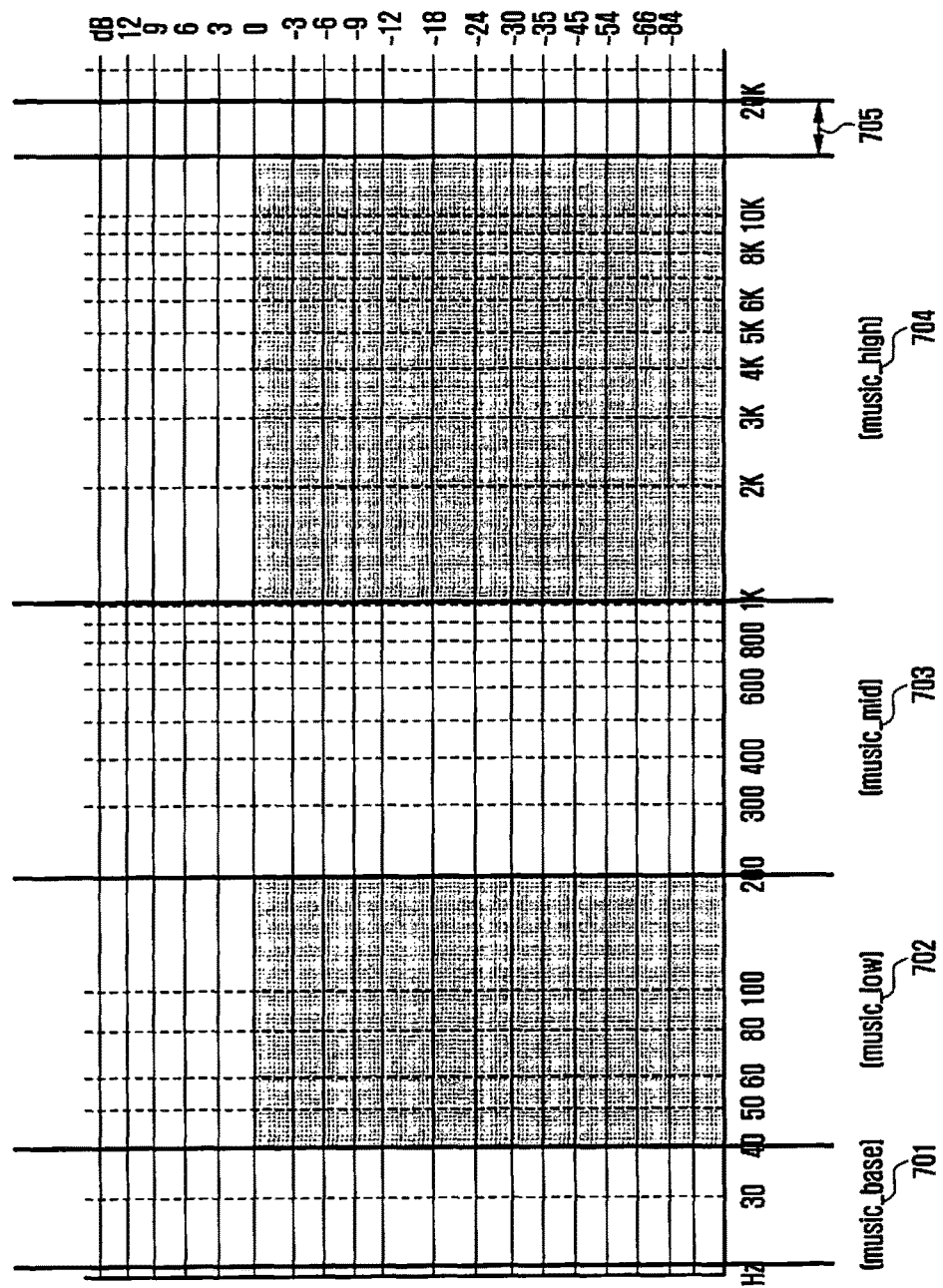
FIG. 7 is a diagram illustrating a division of a frequency spectrum into sound level ranges to which the colors extracted from an image are mapped, according to an embodiment of the present invention.

FIG. 7 is a diagram illustrating division of a frequency spectrum into sound level ranges to which the colors extracted from an image are mapped, according to an embodiment of the present invention.

In FIG. 7, a music_base band 701 is set to the range of 0 to 40 hz, a music_low band 702 is set to the range of 41 to 200 hz, a music_mid band 703 is set to the range of 201 to 1000 hz, and a music_high band 704 is set to the range of 1001 to 16000 hz. Band 705 is set to the range of 16000 hz to 20000 hz, and is a reserved band. The band configuration may be performed differently. For example, at least one of the low frequency band, intermediate frequency band, and high frequency band may be configured narrower than the above ranges. Also, the frequency spectrum may be divided into the bands smaller in number than the bands as shown in FIG. 7. The number of bands may be determined in consideration of the load of the control unit in the stage of manufacturing the electronic device. If a large number of bands does not cause significant overload to the control unit, it is possible to design the electronic device such that the user can configure the sound visualization function diversely for audio file playback.

In the case of configuring the sound bands depending on the audio data, it is possible to use the genre of the audio data. For example, when the audio data is of classical music and has information indicating fast playback speed and high frequency band, it is possible to preset a frequency band configuration for the fast and high frequency range classical music in the memory 220 and discern the frequency bands according to the preset configuration. In another example, it is possible to preset a frequency configuration for heavy metal music, which is different from that of the classical music. In this way, it is possible to configure the frequency bands using the properties and genre information of the audio data stored along with the audio data.

As described above, the control unit divides the audible sound band into a plurality of sub-bands depending on the type of the audio data and maps the colors to the corresponding sub-bands, in step 406. Various methods of mapping the pieces of color information to the sound level ranges are described below.

When two of the five sound level ranges are used as shown in FIG. 7. The color 611 occupying the highest percentage in the image file is used as the background color of the audio file visualization, the colors 612 and 613 occupying the second and third highest percentages are mapped to the music_low band and music_high band 702 and 704, respectively. As shown in FIG. 7, if only the two sound level ranges are used with the color information acquired from the image, the audio signals of the other sound level ranges having no mapped color information are not visualized, but may be presented as a default color, e.g. white or black.

If N colors are extracted as shown in FIG. 6, all or some of the N colors may be used depending on the number of sound level ranges and mappings. If the number of sound level ranges is greater than the number of colors acquired from the image, no color may be mapped to certain sound level ranges, as shown in FIG. 7.

The above description has been directed to the case where the extracted colors are mapped, as they are, to specific sound level ranges. However, all or some of the mapped colors may be inverted. The color inversion may be performed to a complementary color or a certain color acquired by inverting the mapped value digitally. The mapping may be performed in such a way of substituting the extracted colors of the color circle and mapping the color shifted as much as a predetermined value to the left or right on the color circle.

Referring back to FIG. 4, the control unit displays a preconfigured object pattern by means of the display module 260 in the course of playing the audio data, in step 408. The audio data is played in such a way that the audio codec 280 decodes the audio data under the control of the control unit. The decoded audio data is converted to electric signals, which are transferred to the speaker 282. The speaker 282 may convert the electric signal to an audible sound wave. In the case that the audio signal is output through an earphone or other device, the audio signal is converted to the audible sound wave by the corresponding device.

The object pattern displayed by the display module 260, in step 408, may be of a circle, a rectangle, or a cubical pattern. The object pattern may be identical or similar to the pattern displayed on the screen when audio data is played by the PC. The object pattern displayed by the display module 260 may be expressed with the color acquired from the image associated with the audio file, unlike the pattern of certain colors preconfigured in the PC. In more detail, the sound visualization method of embodiments of the present invention divides the audible sound band into several sound level ranges and maps the colors acquired from the image to all or some of the sound level ranges for sound visualization on the display module 260.

Figure 8:
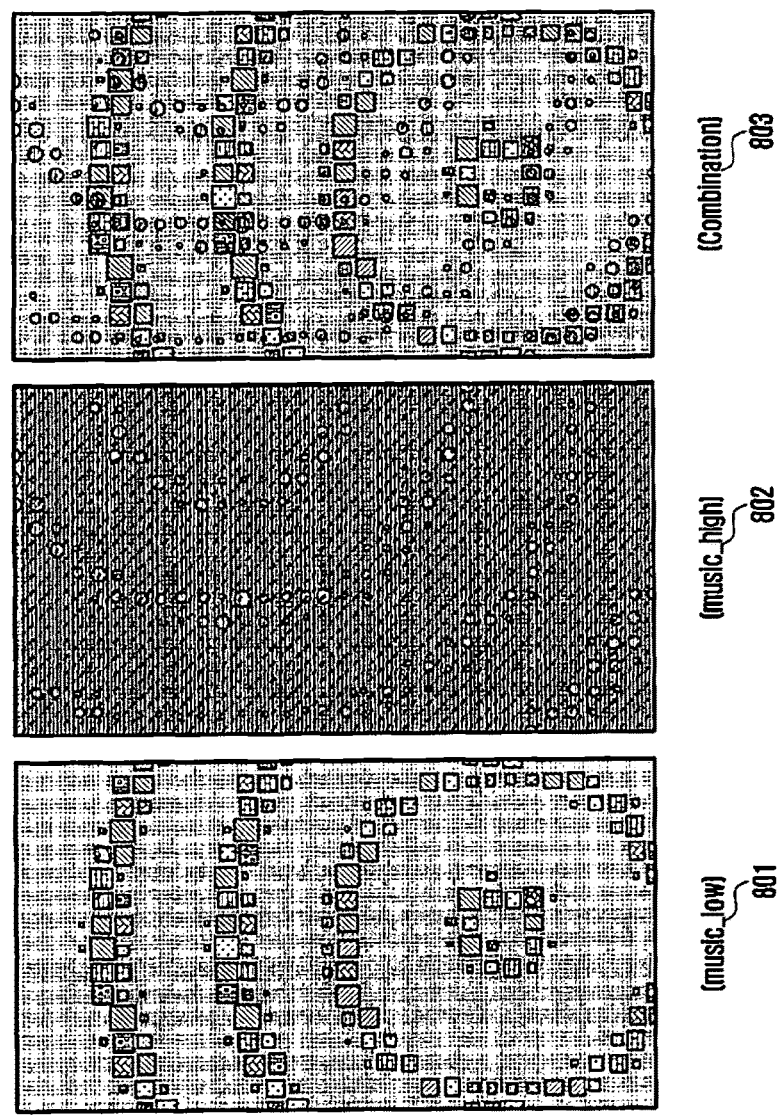
FIG. 8 is a diagram illustrating screen displays of sound visualization, according to an embodiment of the present invention.

Sound visualization is described in detail with reference to FIG. 8. FIG. 8 is a diagram illustrating screen displays of sound visualization, according to an embodiment of the present invention, in which the audible sound band is divided into a plurality sound level ranges to which the colors acquired from the image associated with the audio data are mapped.

In FIG. 8, a first screen image 801 shows a screen display of the display module 260 when only the music_low band audio signal or sound is output, a second screen image 802 shows a screen display of the display module 260 when only the music_high band audio signal or sound is output.

Typically, the music is characterized in that the sounds output simultaneously are dispersed across different sound level ranges but not concentrated in a band. When the audio signals of the low and high frequency bands are played simultaneously, the display module 260 displays the graphic as shown in a third screen image 803.

Since the audio data is played with sounds varying as time goes, the visualization varies constantly in pattern and color, as shown in FIG. 8.

Referring back to FIG. 4, the control unit determines whether a request for changing the object is input through the input module 250 in the course of playing the audio and displaying the object pattern, in step 410.

If a request for changing the object is detected, the control unit reads the object patterns selectable from the memory 220 and displays the object patterns on the display module 260, in step 412. The selectable object patterns may be displayed on a part of the display module 260 while step 408 is performed entirely or partially. Since FIG. 4 is directed to the audio playback mode, the audio playback has to be maintained. The operation of displaying the colors acquired from the image in association with the corresponding bands may be suspended in the course of changing the object pattern. In another embodiment of the present invention, the control unit may control the display module 260 to provide the selected object pattern in a preview format, in step 412.

It is possible to display the selected object pattern to which the colors are mapped or the object pattern based on the image (e.g. album cover image) mapped to the audio data.

For example, the control unit may analyze the album cover image and may cut the album cover image according to the object element of the album cover image.

The control unit may display the object pattern based on the cut images.

The control unit also may determine the shape to be cut out of the album cover image according to the object element constituting the album cover image.

If a request for changing the object is not detected in step 410, the control unit determines whether a request for changing color is input through the input module 250, in step 414. If the request for changing color is detected, the control unit controls the display module 260 to display the colors mapped to the respective sound level ranges and the color circle stored in the memory 220, in step 416. Afterward, the control unit may converts the pieces of information corresponding to the colors to the complementary colors or colors shifted as much as a predetermined value to the left or right on the color circle. As described above, the color change operation is displayed on a part of the display module 260 while step 408 is performed entirely or partially. Since FIG. 4 is directed to the audio playback mode, the audio playback has to be maintained. Meanwhile, the operation of displaying the colors acquired from the image in association with the corresponding bands may be suspended in the course of changing the object pattern. In another embodiment of the present invention, the control unit may control the display module 260 to display a preview image based on the changed mapping information of the selected color information, in step 416.

If a request for changing color is not detected in step 414, the control unit determines whether a request for terminating the audio playback is detected, in step 418. If the request for terminating the audio playback is detected, the control unit ends the routine of FIG. 4. If the routine of FIG. 4 ends, the visualization operation based on the image associated with the audio is terminated along with the end of the audio playback. The routine termination may be requested by the user through the input module 250 or triggered by other important events. The other important events may include the receipt of an incoming call, when the electronic device is a telephone-enable mobile terminal, or an incoming text message. Also, the events may include arrival of a preset alarm time. If no request for terminating the audio playback is detected in step 418, step 408 is maintained.

As described above, the sound visualization method and apparatus of the present invention is advantageous in terms of expressing the mode of a sound using an image matched to the sound. For example, the sound visualization method and apparatus of the present invention is capable of using the cover image of a music album and images matched to the songs contained in the album that are mostly intended to express the mood, emotion, and identity of the music.

Also, the sound visualization method and apparatus of the present invention is advantageous in terms of expressing the mood and emotion of the music being currently played by the electronic device effectively by combining the color data of the cover image of the music album and images matched to the songs contained in the music album with the spectrum data and wave data of the music.

Also, the sound visualization method and apparatus of the present invention is advantageous in terms of improving the emotional quality of a product in such a way of providing an image, graphic, or animation that is well-matched to the mood of the music to which the user is listening.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for audio data playback in an electronic device, the method comprising the steps of:
storing audio data, images matched to the audio data, predetermined graphic animation patterns, color conversion information, and information for sorting sound level ranges;
converting the audio data to an electric audio signal and acquiring pieces of color information included in an image that is matched to the audio data, when the audio data is requested;
mapping at least one of the pieces of color information to at least one sound level range of predetermined audible sound according to a percentage of a respective color in the image;
outputting the electric audio signal in a form of an audible sound wave; and
displaying one of the predetermined graphic animation patterns according to the at least one of the pieces of color information mapped to the at least one sound level range of the predetermined audible sound, when the audio data is played.

2. The method of claim 1, further comprising:
reducing the image to a size-reduced image of a predetermined size,
wherein the pieces of color information are acquired from the size-reduced image.

3. The method of claim 1, wherein mapping the at least one of the pieces of color information comprises:
sorting the pieces of color information by percentage of respective colors in the image;
configuring a piece of color information having a highest percentage as a background color; and
mapping remaining pieces of color information, except for the piece of color information having the highest percentage, to corresponding sound level ranges.

4. The method of claim 3, wherein mapping the remaining pieces comprises matching the remaining pieces of color information to a predetermined number of sound level ranges according to their respective percentages.

5. The method of claim 1, wherein acquiring the pieces of color information comprises:
checking similarities of colors included in the image; and
acquiring the pieces of color information having a similarity higher than a predetermined value.

6. The method of claim 1, wherein mapping the at least one of the pieces of color information comprises mapping inversions of predetermined pieces of color information to predetermined sound level ranges according to percentages of respective colors in the image.

7. The method of claim 1, wherein mapping the at least one of the pieces of color information comprises:
changing the pieces of the color information to a value shifted by a predetermined value on a color circle; and
mapping the changed pieces of the color information to sound level ranges.

8. The method of claim 1, further comprising:
displaying selectable graphic animation patterns, when a request for changing the predetermined graphic animation pattern is detected while displaying the predetermined graphic animation pattern; and
when one of the selectable graphic animation patterns is selected, displaying the selected graphic animation pattern.

9. The method of claim 8, further comprising providing a preview when the one of the selectable objects is selected.

10. The method of claim 8, further comprising maintaining the playback of the audio data, when the one of the selectable objects is selected.

11. The method of claim 1, further comprising:
displaying the pieces of color information mapped to sound level ranges, when a request for changing the pieces of color information is detected;
remapping the pieces of color information to sound level ranges based on change information received in response to a user input; and
displaying the predetermined graphic animation pattern with the remapped pieces of color information.

12. The method of claim 11, further comprising providing a preview, when the pieces of color information are remapped.

13. The method of claim 11, further comprising maintaining output of the audio data, when the pieces of color information are remapped.

14. The method of claim 1, further comprising sorting sound level ranges based on genre information of the audio data.

15. An apparatus for sound visualization of an electronic device, the apparatus comprising:
a memory configured to store audio data, images matched to the audio data, preconfigured graphic animation patterns, color conversion information, and information for sorting sound level ranges;
an audio codec configured to convert the audio data to an electric audio signal;
a speaker configured to output the electric audio signal in a form of an audible sound wave;
a display module configured to display one of the preconfigured graphic animation patterns according to the sound level range of the output audio signal; and
a control unit configured to control acquiring pieces of color information included in an image that is matched to the audio data when the audio data is requested, mapping at least one of the pieces of color information to at least one sound level range of predetermined audible sound according to a percentage of a respective color in the image, and displaying a predetermined graphic animation pattern on the display module according to the at least one piece of color information mapped to the at least one sound level range of the predetermined audible sound when the audio data is played.

16. The apparatus of claim 15, wherein the control unit is further configured to reduce the image to a size-reduced image of a predetermined size and acquire the pieces of color information from the size-reduced image.

17. The apparatus of claim 15, wherein the control unit is further configured to sort the pieces of color information by percentage of respective colors in the image, configure a piece of the color information having a highest percentage as a background color, and map remaining pieces of color information, except for the piece of color information having the highest percentage, to corresponding sound level ranges.

18. The apparatus of claim 15, wherein the control unit is further configured to check similarities of colors included in the image and acquire the pieces of color information having a similarity higher than a predetermined value.

19. The apparatus of claim 15, wherein the control unit is further configured to change pieces of the color information to a value shifted by a predetermined value on a color circle and map the changed pieces of the color information to the sound level ranges.

20. The apparatus of claim 15, wherein the sound level ranges are sorted based on genre information of the audio data.

* * * * *